United States Patent
Wilson

(10) Patent No.: US 7,289,979 B2
(45) Date of Patent: Oct. 30, 2007

(54) PARALLEL ASYMMETRIC BINARY SEARCH ON LENGTHS

(75) Inventor: David James Wilson, Kanata (CA)

(73) Assignee: Alcatel Lucent, Paris (FR)

( * ) Notice: Subject to any disclaimer, the term of this patent is extended or adjusted under 35 U.S.C. 154(b) by 489 days.

(21) Appl. No.: 10/731,125

(22) Filed: Dec. 10, 2003

(65) Prior Publication Data

US 2005/0131867 A1    Jun. 16, 2005

(51) Int. Cl.
*H04L 12/28* (2006.01)
(52) U.S. Cl. .......................................... 707/2; 370/392
(58) Field of Classification Search ................. 707/3, 707/2; 370/392
See application file for complete search history.

(56) References Cited

U.S. PATENT DOCUMENTS

| | | | | |
|---|---|---|---|---|
| 6,018,524 | A * | 1/2000 | Turner et al. | 370/392 |
| 6,516,319 | B1 * | 2/2003 | Benayoun et al. | 707/100 |
| 6,810,037 | B1 * | 10/2004 | Kalapathy et al. | 370/392 |
| 6,813,620 | B2 * | 11/2004 | Lin et al. | 707/10 |
| 6,947,931 | B1 * | 9/2005 | Bass et al. | 707/6 |
| 6,996,559 | B1 * | 2/2006 | Beshai | 707/6 |
| 2004/0044868 | A1 * | 3/2004 | Guerrero | 711/164 |

OTHER PUBLICATIONS

Selim G. Akl, et al. Parallel Binary Search, IEEE Transactions on Parallel and Distributed Systems vol. 1, No. 2, Apr. 1990.

L.L. Miller, et al. A Parallel Binary Search Processor For Fast Data Retrieval, International Journal of Mini & Microcomputers 12 (1990) No. 1, Anaheim, CA, US., pp. 29-35.

Sarang Dharmapurika, et al., Longest Prefix Matching Using Bloom Filters, SIGCOMM '03, Aug. 25-29, 2003, Karlsruhe, Germany, p. 201-212.

Waldvogel, et al., Scalable High Speed IP Routing Lookups, Computer Engineering and Networks Laboratory, 1997.

Miguel A. Ruiz-Sanchez, et al., Survey and Taxonomy of IP Address Lookup Algorithms, IEEE Network Mar./Apr. 2001, pp. 8-23.

Ok-Hyeong Cho, et al., Associative Random Access Machines and Data-Parallel Multiway Binary-Search Join, Future Generation Computer Systems 13 (1997/98) 451-467.

Jaehyung Park, et al., Parallelisation of trie-based longest prefix matching for fast IP address lookups, Electronics Letters, Dec. 5, 2002 vol. 38, No. 25.

Andrei Broder, et al., Using Multiple Hash Functions to Improve IP Lookups, IEEE INFOCOM 2001, pp. 1454-1463.

* cited by examiner

*Primary Examiner*—Don Wong
*Assistant Examiner*—Angela M Lie
(74) *Attorney, Agent, or Firm*—Kramer & Amado, P.C.

(57) ABSTRACT

Parallel binary searches on lengths using hash tables is described. The parallel search uses more than one search instance. The search instances probe in parallel mutually different contiguous ranges of a search area during each round of searches. After each round, a new search area is defined and one or more search instances are redeployed into the new search area. The search instance for a range of shorter lengths can be redirected to help those of the longer lengths. Due to the help from other search instances, some ranges can be made large without sacrificing the performance. The invention realizes faster address lookups even for longer address lengths.

30 Claims, 8 Drawing Sheets

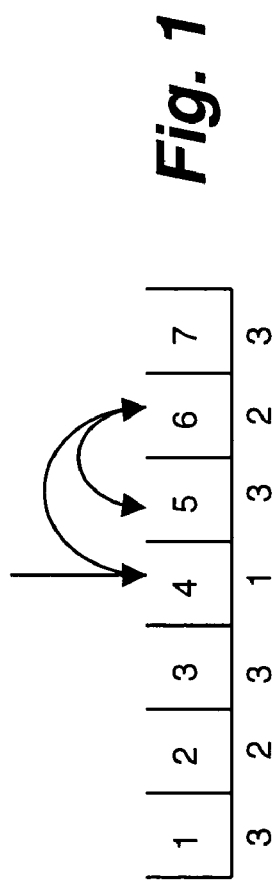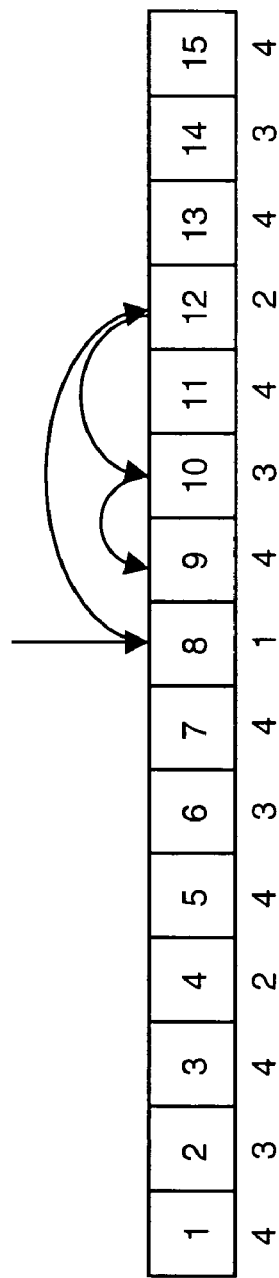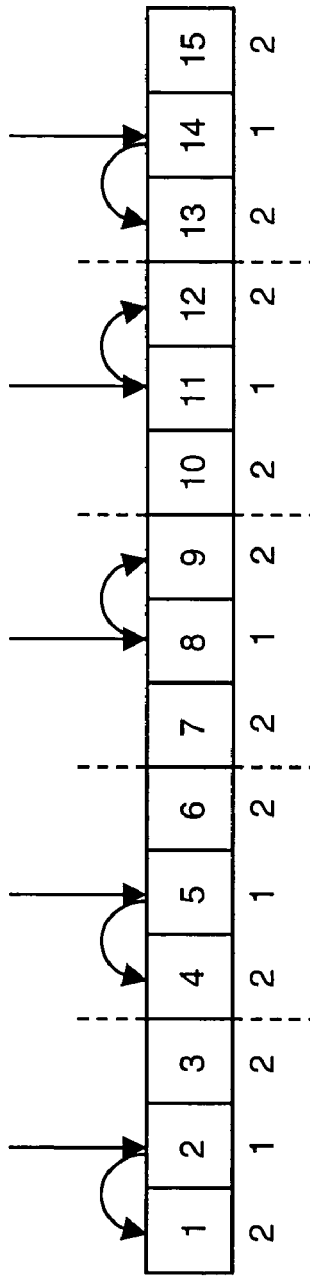

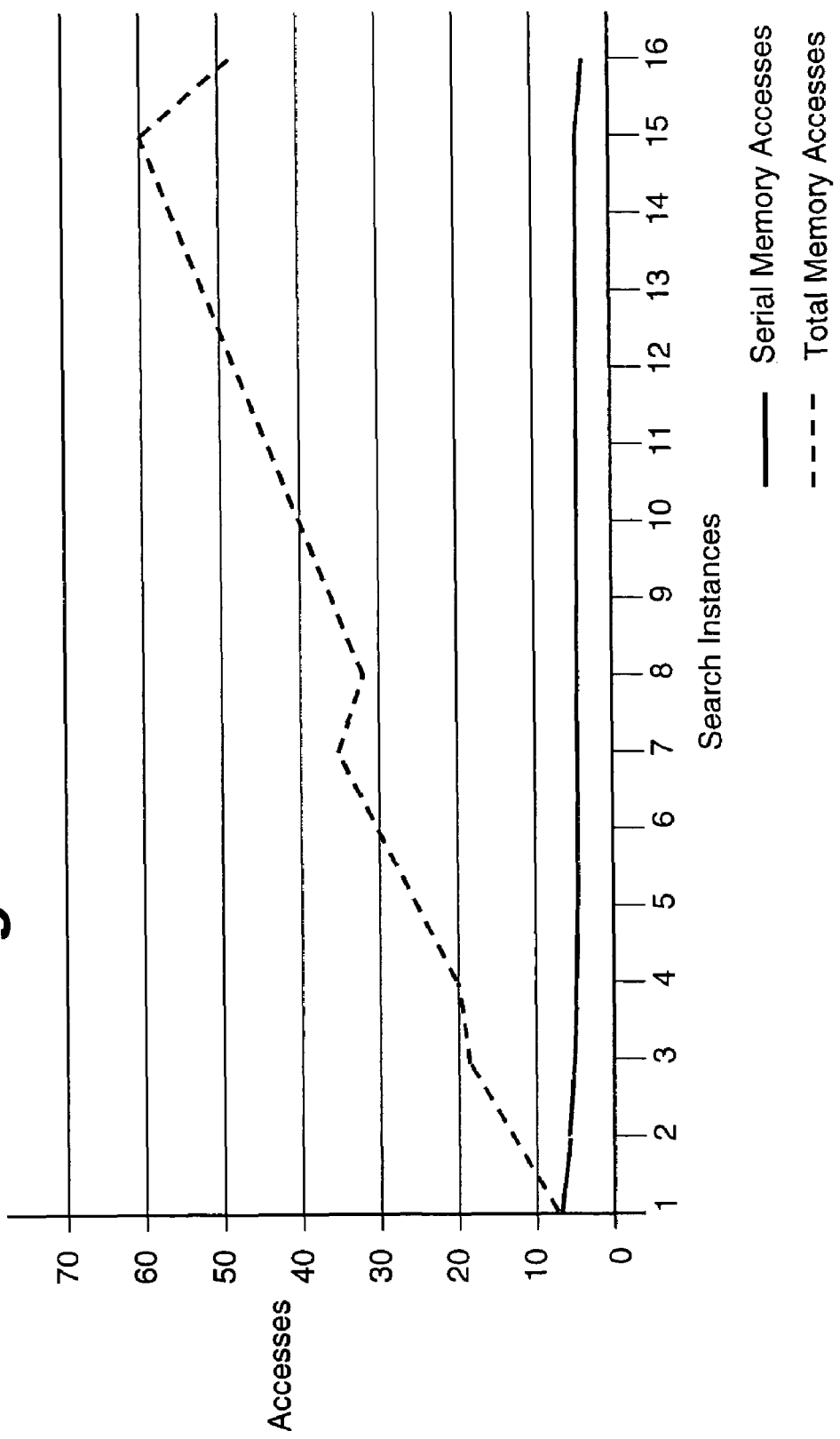

Fig. 8

Searchable bins by number of ranges and worst case lookup

| Worst Case Lookup | Range 1 |
|---|---|
| 1 | 1 |
| 2 | 212 |
| 3 | 3231323 |
| 4 | 43424341434242434 |

| Worst Case Lookup | Range 2 | |
|---|---|---|
| 1 | 1 | |
| 2 | | 2122 |
| 3 | | 323313233233 |
| 4 | 4344243443441434243444243444344 | |

| Worst Case Lookup | Range 3 |
|---|---|
| 1 | 1 |
| 2 | 21222 |
| 3 | 32333132332332333 |
| 4 | 43444243443444143424344344442434443444 |

| Worst Case Lookup | Range 4 |
|---|---|
| 1 | 1 |
| 2 | 212222 |
| 3 | 3233313233323332333323333 |
| 4 | 434444243443444344414342434424344434444243444344443444 |

Range Sizes

| Worst Case Lookup | Range 1 | Range 2 | Range 3 | Range 4 |
|---|---|---|---|---|
| 1 | 1 | 1 | 1 | 1 |
| 2 | 3 | 4 | 5 | 6 |
| 3 | 7 | 12 | 18 | 25 |
| 4 | 15 | 32 | 56 | 88 |
| 5 | 31 | 80 | 160 | 280 |
| 6 | 63 | 192 | 432 | 832 |
| 7 | 127 | 193 | 433 | 833 |

Fig. 9

Initial range sizes by worst case lookup

Number of Search Bins

| Worst Case Lookup | 1 Search Instance | 2 Search Instances | 3 Search Instances | 4 Search Instances |
|---|---|---|---|---|
| 1 | 1 | 2 | 3 | 4 |
| 2 | 3 | 7 | 12 | 18 |
| 3 | 7 | 19 | 37 | 62 |
| 4 | 15 | 47 | 103 | 191 |
| 5 | 31 | 111 | 271 | 551 |
| 6 | 63 | 255 | 687 | 1519 |
| 7 | 127 | 320 | 753 | 1586 |

Fig. 10

Number of search bins by worst case lookup

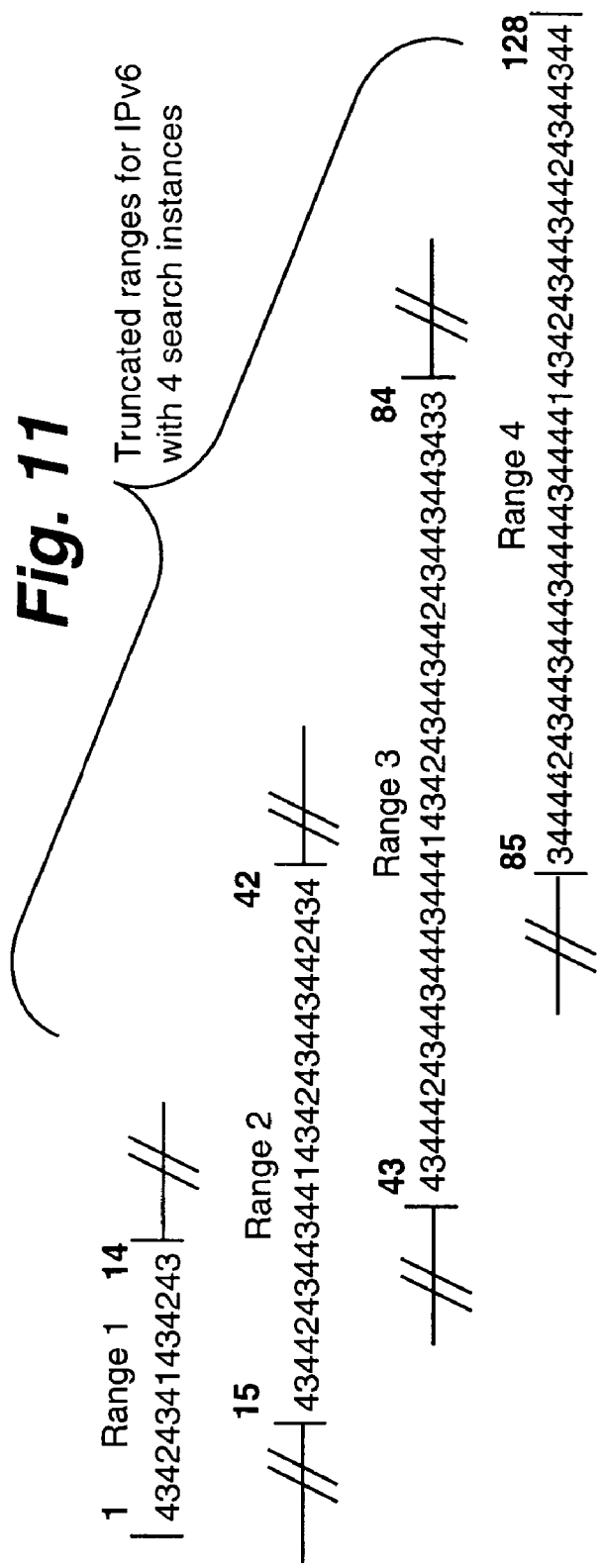

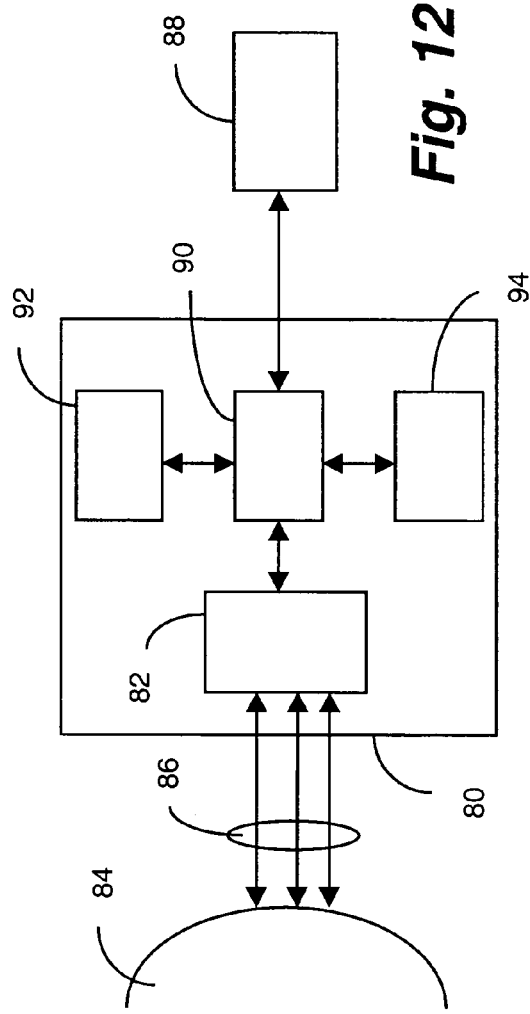

Pseudo-Code:

```
searchNumber = 0
for each search instance
    initialize(currentInstance.searchValue)

loop {
    searchNumber++
    for each search instance {
        // Perform hash on prefix and initiate hash lookups
        hashLookup(currentInstance.seachValue)
    }

/* Check the search results of each search instance from highest to lowest.  This way if there is a hit at a
    long prefix, the lower instances do not need to be checked. */
    for (numInstances downto 1) {
        // Check if the search was a match
        if (search hit or marker) {
            // Check "Best" bit.  If there is no better matches then the search stops here
            if set(Best)
                return (current)
            // If we hit a marker or there are better matches, update state and steal remaining instances
            for ((currentInstance-1) downto 1) {
                stealInstace.searchValue = currentInstance.searchValue + stealTable[stealInstance][searchNumber]
            }
            currentInstance.searchValue += stateTable[searchValue].Hit
            // Break out of the for loop as we no longer care about the rest of the results
            break;
        } else
            // We missed so search shorter prefixes
            currentInstance.searchValue -= stateTable[searchValue].Miss
    }
}
```

*Fig. 15*

PARALLEL ASYMMETRIC BINARY SEARCH ON LENGTHS

FIELD OF INVENTION

The invention resides in the field of IP forwarding address lookups (IP lookups or simply lookups for short). Generally speaking, it is directed to binary search techniques used for database lookups. More specifically it relates to improvements in a binary search which is designed for longest prefix matching (LPM for short).

BACKGROUND OF INVENTION

One of the most significant functions performed by routers is the IP lookup. Presently the majority of routers forward IPv4 (IP version 4) packets, but increasing numbers are now also forwarding IPv6 (IP version 6) packets. IPv6, mainly introduced to alleviate the address shortage of IPv4, uses 128 bit addresses. When a packet arrives, the router must search a forwarding table using the IP address and determine which entry in the table represents the best route for the packet to take to reach its destination. The IP address scheme is hierarchical in that it uses the concept of variable-length prefixes e.g., roots and branches. Entries in the table represent prefixes and have variable lengths. The use of prefixes introduces a new dimension in that multiple entries (prefixes) may represent valid routes to the same destination. If a packet matches multiple prefixes, it is intuitive that the packet should be forwarded corresponding to the most specific prefix, also known as the longest matching prefix. Therefore, unlike a simple search that seeks to find an exact match within a table, these lookups must find the most specific route from a number of entries, i.e., the route that represents the best network prefix for the given address (the longest prefix matching or LPM for short).

There are two techniques for addressing the LPM problem. The first technique is based on converting the longest matching prefix problem into a series of exact matches, and the second technique is based on performing a series of incremental matches using a data structure called a tree (or trie). The first technique will be discussed in more detail below. A tree is a data structure which allows for an incremental search by matching one or more bits of a key at a time. A tree is a collection of nodes, each node containing a table of pointers. One solution for IPv4 forwarding lookups uses a binary tree, in which each tree node is a table consisting of two pointers. To find the best matching prefix in the tree, successive bits of the address are used to follow a path through the tree, starting from the root node (top most node), until the longest matching prefix is found. Thus the performance of a tree can depend directly on the number of bits in the address, the number of bits used at each incremental step, and the number of entries in the routing table.

Since the present invention makes use of the previously mentioned technique of converting a best matching prefix problem into an exact match problem it will be discussed in more detail. In this technique, the forwarding table is divided into several (at most 32 in IPv4) logically separate forwarding tables such that table i contains all the prefixes of length i. In other words, prefix 1* is in the length 1 table, prefix 10* is in the length 2 table, and so on. Using a linear search, a longest prefix match is performed by starting with the longest length prefix table and working backwards until it finds a table that contains a matching prefix. Each search through a table requires an exact match (unlike finding the best or longest matching prefix). As this algorithm uses a linear search it can cost up to 32 exact matches for IPv4 and 128 exact matches for IPv6 in the worst case scenario.

A good technique to use for finding an exact match is hashing. A hash function is a sort of compression algorithm that is used to condense a key into a smaller sized field which can be used as an index into a table. Because of the nature of compression, hashing inevitably encounters the problem of collision (i.e., different keys result in a same hashed value). Higher compression ratios result in higher occurrences of hash collisions. Hashing operates strictly on an exact-match basis, thus a hash lookup can only search for prefixes of a given length.

Despite the ability of being able to search all the entries of a single prefix length in a single hash lookup, the above technique could still need to perform this lookup for every possible prefix length in order to find the LPM. Hence, this could require up to 32 hash lookups for IPv4, and 128 for IPv6. This performance is inadequate.

U.S. Pat. No. 6,018,524 Jan. 25, 2000 Turner et al describes an algorithm for improved binary search which is applied to IP LPM. This algorithm is an improvement to the previously described linear search over a set of hash tables. This improvement is achieved by replacing the linear search with a binary search. This allows the number of potential prefix lengths to be cut in half after each step of the search. Compared to the linear search, which is only able to eliminate a single prefix length at a time, this is a significant improvement. To facilitate a binary search, the algorithm must insert markers into the logical prefix length tables in order to indicate that there is a potentially longer matching prefix when there are no prefixes at the current level that share the same root. To contrast with the present invention which will be described in detail below, this search is called the serial binary search in this specification.

FIG. 1 shows an example of this algorithm. In this figure, there are seven logical bins. Each bin would contain all the prefixes of a particular length. The binary search starts at the midpoint of the search range, in this case at Bin 4. In this example, at Bin 4 the search returned either a marker or a match on the prefix. In either case, the result of the match would be stored as the best possible prefix. The search then proceeds to Bin 6, the midpoint of the remaining bins. Here, the search fails to find either a marker or a matching prefix so the range is reduced to the set of bins with prefixes shorter than those between Bin 4 and Bin 6. At Bin 5, the search is successful and the result is the best possible match. In this figure the numbers below the bins show the number of memory accesses required to find an entry in that bin.

In the worst case, this binary search on prefixes would require $\log_2(W)$ serial memory accesses (memory reads or probes), where W is the number of unique prefix lengths in bits This performance is already better than the majority of LPM algorithms.

As mentioned previously, IPv6 has recently been introduced to alleviate the address shortage of IPv4, and uses 128 bit addresses. The dramatic increase in the address length makes it difficult for many existing IPv4 lookup algorithms to simply scale up to IPv6. Using algorithms that are currently used for IPv4 to implement IPv6 forwarding would likely result in an explosion in the size of routing table data structures, and an increase in the number of memory accesses needed to perform the lookup. Fortunately, IPv6 makes use of hierarchical addressing which is intended to simplify the routing tables of IPv6 routers. Without hierarchical addressing, IPv6 routing tables would be reduced to the swamp of prefixes that exist today in IPv4.

Presently, the majority of allocated IPv6 prefixes are longer than 16 bits, and usually share a common prefix (0x2001, 0x2002, and 0x3FFE). Because of this, techniques used to accelerate IPv4 lookups, such as doing an initial lookup of the first 16 bits of an address will likely only ever return one of a few possible results at best. This single memory access is difficult to justify as it simply selects between one of the small number of entries, and the memory required to support this lookup is large.

As routers forward at higher speeds, the efficiency of the forwarding algorithm can make a significant impact on the performance of the system. More efficient algorithms will allow higher line rates to be achieved.

To simplify the description of the invention, following terms are roughly defined.

Bin: A logical table containing entries for IPv6 prefixes which all have the same length. The number of bins equals the number of unique prefix lengths. Possible implementations of a bin could include an individual hash table for a bin, or a single large hash table containing all bins such that a portion of the hash key contains some reference to the bin.

Ideal Asymmetric Search: A search in which every search instance in a parallel LPM search has the same worst case search time. This requires that each search range is sized appropriately to distribute the gains of the LPM improvements over the search ranges. An ideal asymmetric search results in a search that is able to examine the largest number of bins, given a fixed number of search instances, and latency budget.

Marker: An entry in a bin which does not represent a prefix. Instead, the entry indicates that there is a longer prefix with the same root. A marker may also contain a pointer to the next-hop information of the longest prefix sharing the same root as the marker, if such a prefix exists.

Range Truncation: A process that takes an ideal asymmetric search ranges and shortens it to a usable size (128 or 32 bins) in such a way as to not break up sub-ranges which may be ideally searched.

Root: A portion of a prefix that is common with that of another prefix. In other words, a prefix of prefixes.

Steal: A process, in parallelized LPM searches in which a search instance redistributes other search instances, which were previously searching shorter prefix lengths, along its remaining search range.

SUMMARY OF INVENTION

The invention achieves optimizations to the prefix matching algorithm described in the aforementioned U.S. patent to Turner et al. These optimizations allow for parallelization of the binary search of the basic algorithm in order to reduce the latency of a search, thus allowing the algorithm to scale better to longer addresses. The algorithm of the invention is applicable equally to IPv4 and to IPv6, or, in general, to any LPM problem.

In one aspect, the invention uses a plurality of parallel search instances, each probing a separate area of the routing table. In the event of a match by any of the search instances, all the search instances searching shorter prefix lengths are redeployed for a succeeding round of searches to the remaining range of the search instance with the longest prefix match in the last round.

In a further aspect of the invention, the original search areas are divided into a plurality of differently sized contiguous ranges, and one search instance is assigned to each range. Because search instances in ranges of longer prefixes can expect help, through stealing, from those searching shorter prefixes, the sizes of the ranges are adjusted to even out the worst case memory access across all the ranges.

In a yet another aspect of the invention, the starting locations of the first round of searches are predetermined. That of the lowest range is at near midpoint of the range. Those of the adjacent ranges are offset from the midpoint progressively toward the low end of the range as the prefix lengths increase.

In accordance with one aspect, the invention is directed to a method of conducting a LPM (longest prefix match) search in a database which holds a plurality of prefixes in groups, and defines an initial search area made up of a plurality of ranges. The method comprises steps of (a) performing a round of binary LPM searches by executing a plurality of search instances in parallel, each search instance searching in a different range of the initial search area and (b) in response to the last round of binary LPM searches, defining a new search area by eliminating, from further searches, one or more ranges. The method further includes steps of (c) performing a further round of binary LPM searches by executing the plurality of search instances in parallel, each search instance searching in a different sub-range of the new search area and (d) in response to the last round of binary LPM searches, defining further a new search area by eliminating, from further searches, one or more sub-ranges. The method further includes steps of (e) storing a longest match if found in a round of binary LPM searches and (f) if necessary, repeating steps (c) to (e) to further narrow the new search area until either one of the search instances finds a longest matching prefix, or all the search areas have been searched, in which case the last longest match becomes the longest matching prefix.

In accordance with yet another aspect, the invention is directed to a method of conducting a LPM (longest prefix match) search in a packet forwarding device having a routing table containing a plurality of prefixes stored in a plurality of bins, each of which may contain one or more prefixes of the same length and markers, in which all the bins being logically sorted in an ascending order of their lengths and defining an initial search area which are divided into a plurality of contiguous ranges, within each of which range the bins are logically preordered for access in each round of binary LPM searches. The method includes steps of (a) performing a first round of binary LPM searches by executing a plurality of search instances in parallel, each search instance searching in its respective range, starting at the bin preordered for the first access within the range, (b) continuing further rounds of binary LPM searches by executing a plurality of search instances in parallel, each search instance searching in its respective range, starting at a successively preordered bin or at one directed by a marker. The method further includes steps of (c) if a match or marker is found by a search instance in each round of binary LPM searches, storing it in a memory as a last longest match, and (d) defining a new search area by eliminating, from further searches, one or more ranges containing bins of prefix lengths shorter than the last longest match. The method still includes steps of (e) performing a further round of binary LPM searches by executing the plurality of search instances in parallel, each search instance searching in a different sub-ranges of the new search area, and (f) if necessary, repeating steps (b) to (e) to further narrow the new search area until either one of the search instances finds a longest matching prefix or all the search areas have been searched, in which case the last longest match becomes the longest matching prefix.

In a further aspect, the invention is directed to an apparatus for conducting LPM (longest prefix match) searches in a packet forwarding device. The apparatus comprises a routing table containing a plurality of prefixes to be searched and defining an initial search area, a plurality of search instances for performing a plurality of rounds of parallel binary LPM searches in their respectively assigned portions of the initial search area, and an analyzing module for defining a new search area within the initial search area in response to the results of a last round of binary LPM searches. The apparatus further includes a memory for storing a longest match found in a round of binary LPM searches and a controller for assigning the search instances to perform successive rounds of binary searches within mutually different portions of the new search area until one of the search instances finds the longest matching prefix.

Throughout the specification, the algorithm and optimizations will be analyzed in terms of IPv6 because it is considered to be the target application for these optimizations. The algorithm and optimizations can be applied to IPv4 lookups or any LPM lookup.

BRIEF DESCRIPTION OF DRAWINGS

FIG. 1 is a schematic illustration of a binary search mechanism, involving 7 bins.

FIG. 2 is a schematic illustration of a binary search mechanism, involving 15 memory bins. The illustration shows an unparalleled search mechanism.

FIG. 3 is a schematic illustration of a parallelized binary search mechanism, involving 15 memory bins, according to one embodiment of the invention.

FIG. 4 is a graph showing a relationship between the memory accesses and the number of search instances.

FIG. 8 is a table that shows the ideal asymmetric search patterns in the cases employing one to four search instances.

FIGS. 9 and 10 are tables that show the sizes of the ideal ranges and total prefix lengths (the total number of bins) that can be searched with several search instances.

FIG. 11 shows one example of the resulting ranges which contain the total of 128 memory bins to be applicable to IPv6.

FIG. 12 is a schematic illustration of a router according to one embodiment of the invention.

FIG. 13 shows a possible format for the relative state information.

FIG. 14 shows a possible format for the information in the steal table.

FIG. 15 is a pseudo-code which describes algorithm applicable to a variety of embodiments of the invention described in the specification.

DETAILED DESCRIPTION OF EMBODIMENTS

Figure 5:
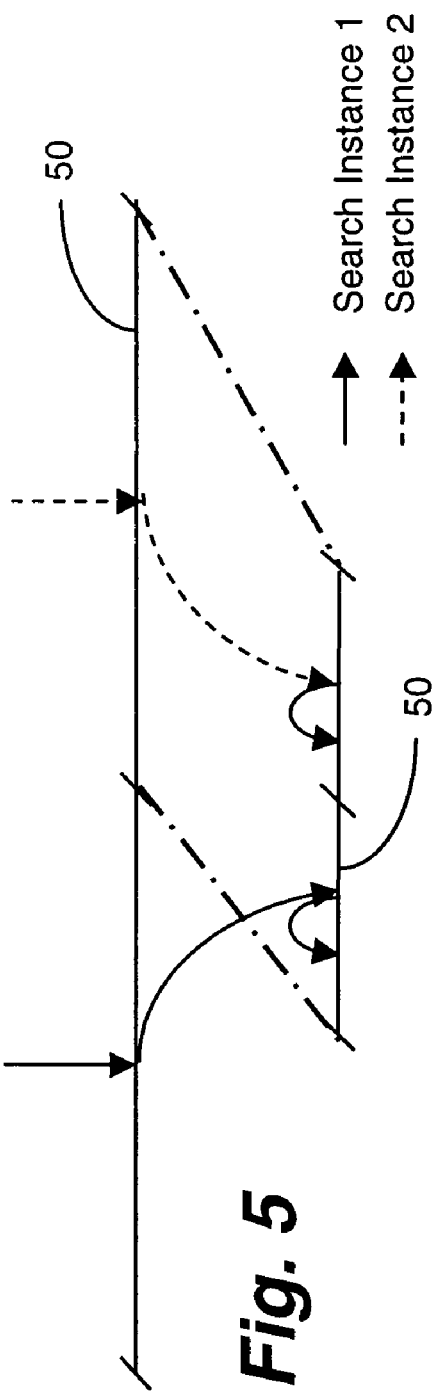
FIG. 5 is a schematic illustration of one way of further improvement of the invention according to a further embodiment. It shows redistribution of search instances after a search hit.

As routers reach higher speeds, existing IP forwarding algorithms may not be able to scale to meet demand due to memory constraints, such as latency, size, etc. Parallelized algorithms enable a series of dependant memory accesses to be performed in parallel by removing the dependencies between subsequent memory accesses. Enabling parallel memory accesses allows for an overall reduction in lookup latency, which can be accomplished by issuing parallel memory accesses to several memory banks at once, or issuing several memory accesses to a single memory bank such that the latencies of these memory accesses overlap. One major issue with the majority of IP forwarding algorithms, however, is that they are difficult to parallelize. Tree searches, for example, cannot be parallelized as the decision of which branch of a tree to follow depends on the path through the tree that has been taken up to that point.

The invention is a series of three improvements over the techniques described in the aforementioned U.S. patent to Turner et al. In the specification, the binary search algorithm described therein is referred to as the basic algorithm for binary search.

1. Parallelization

It has been realized that by using multiple independent search instances, as opposed to a tree search, parallelization is easily achieved with the serial binary search algorithm described earlier. This is because the search range of the serial binary search can easily be partitioned and multiple independent search instances can simultaneously and independently search each partition.

In accordance with an embodiment of the invention, the search range is divided into a number of evenly sized sub-ranges and multiple search instances are provided, each search instance performing a search on one of the smaller sub-ranges. FIG. 3 shows a search of 15 bins being parallelized by using five search instances, while FIG. 2 shows a search process of the binary search without parallelization for comparison (i.e., serial binary search). In FIG. 2, an example of a search instance is shown as probing bins 8, 12, 10 and 9 in that order. At bin 9, the search is complete. In FIG. 3, the dotted lines show the breakdown on the total search range into a set of sub-ranges, each being searched by a single search instance. In this example, each search instance handles three bins. Both FIGS. 2 and 3 show the number of serial memory accesses required to find an entry in a particular bin below each bin. As seen in FIG. 3, in the parallelized case the worst case lookup is two serial memory accesses as compared to the non-parallelized case which has a worst case of four memory accesses. It should be noted that while in the figures bins are shown as arranged and sorted in a specific order, they may, in reality, be sorted logically and not sorted physically. In an actual implementation, there is some way of viewing them as sorted or accessing them as sorted.

In this specification, a distinction is made between parallelized searches and parallel searches. Parallelized searches are done by running several search instances concurrently, each one performing a search on the same address, but at different prefix lengths. A parallelized search could make use of multithreaded processors, or several processors, but could also simply use a single processor by overlapping the latency of memory accesses. On the other hand, parallel searches result in concurrent lookups for different addresses, whether on one or more processors or using multithreading. In other words, the main difference between the two techniques is the parallel searches are simply a pipeline in which adding more stages simply increases the number of simultaneous searches that can be performed but does nothing to decrease the time required to perform an individual search. Whereas, a parallelized search allows for the time required to perform an individual search to be reduced by adding more processing elements. The two techniques could be combined, in that, several parallelized searches can be performed simultaneously to increase the number of searches that can be performed at once. In this specification, the term "parallelization" is used to denote "parallelized search" and other related items.

Basic parallelization reduces the number of serial memory accesses to perform a search to $\log_2(N/n)$, where N is the number of prefix lengths that need to be searched, and n is the number of search instances running in parallel.

The tradeoff, for the increase in speed, is an increase in the memory bandwidth. In the worst case there may be $\log_2(n)$ less serial accesses, but in total there will be n times the number of memory accesses in each step. Therefore as an example, for IPv6 with 4 search instances, the number of serial accesses is reduced from $\log_2(128)=7$ to $\log_2(128/4)=5$, while the total memory accesses is increased from 7 to 20 (4 search instances, with 5 searches each).

The table below summarizes these results.

|   | Serial Memory Access | Total Memory Access |
|---|---|---|
| 1 Search Instance | 7 | 7 |
| 4 Search Instances | 5 | 20 |

FIG. 4 is a graph which shows a relationship between the memory accesses and the numbers of search instances. The graph shows two curves, one for the serial memory accesses and another for the total memory accesses. The figure illustrates that the total memory accesses (the number of searchable memory bins) increases rapidly in number with increase in the number of search instances, while serial memory accesses slowly decline. This shows the tradeoff between memory bandwidth and lookup latency, and that achieving a very low latency comes at a high cost in terms of total memory bandwidth.

As mentioned earlier, parallelized searches using network processors can be realized by enabling parallel memory accesses which can be implemented by issuing parallel memory accesses to several memory banks at once, or issuing several memory accesses to a single memory bank such that the latencies of these memory accesses overlap. Unlike network processors, general purpose processors, on the other hand, do not have hardware support for threads, thus, parallel processing is not easily achievable on general purpose processors. It is, however, possible to realize parallelism in the memory accesses. Most general purpose processors will stall execution in the event that a memory access must go to off chip memory. Thus, to achieve optimal performance, an attempt to have all memory accesses satisfied by the cache should be made. Due to the nature of hash lookups, however, addresses in memory are accessed in a relatively random order. Thus, keeping all the entries in the cache is a difficult task. To overcome this, the implementation uses prefetch instructions, supported by most major general purpose processors. The prefetch instruction allows the cache to be preloaded with data in order to attempt to avoid stalling the processor. Once all the prefetches have been issued, the actual memory access can be performed in serial as all the information should be located in the on chip cache and quickly accessible.

2. Stealing Search Instances

In accordance with a further embodiment, the invention takes advantage of characteristics of the parallelized binary LPM search which has been described above. In this further embodiment, in the event that there is a search match for one search instance, other instances searching ranges of shorter prefixes can be redistributed along the remaining range of the search instance that had the match. The motivation behind this is that it is not possible for those search instances to ever find a better match (a match of a longer prefix) in such ranges of shorter prefixes, thus they could be put to better use elsewhere. This allows the search to quickly focus in on the ranges in which there are the longest possible matches, and ignore all ranges in which it is known that there are no better matches.

FIG. 5 shows redistribution of search instances after a search hit. In this example, search instance #2 has a search hit, indicating a possible existence of a better match in the upper portion of search instance #2's range denoted by numeral 50. This causes the two search instances #1 and #2 to be redistributed, regardless of the search results of the first search instance. The fact that search instance #2 has a hit indicates that it is not possible to find a better match below the hit found by search instance #2. Even if search instance #1 has a hit, this hit can not be any better than the hit by search instance #2. Now both search instances #1 and #2 are deployed over the upper portion 50, which is shown in more detailed fashion in the lower half of the drawing. As seen in the figure, search instance #1 now searches lower half of range 50 and search instance #2 searches its upper half. The parallelized binary search then continues normally with the two instances searching their new ranges, both starting at midpoint of the respective half.

This embodiment does not improve the worst case search as search instances will never be redistributed along the range with the shortest prefix lengths, and this improvement can only be used after a search hit. It does, however improve the average case, as in shown in the table below. The Table compares serial memory accesses for regular LPM and for a LPM with the feature of search instance redistribution.

|   | Worst Case Serial Accesses | Average Case Serial Accesses |
|---|---|---|
| Parallel LPM | 5 | 4.16 |
| Parallel LPM with stealing | 5 | 3.57 |

It should be noted that the behaviour of a search instance in this embodiment is no longer independent from other search instances. If a search instance that is looking at longer prefixes has a search hit, it will steal the other search instances for redistribution regardless of the results of the searches of those instances.

If the search instances are processed in order of decreasing prefix length, one consequence of a hit is that processing for search instances examining shorter prefixes does not need to be performed, thus resulting in an improvement of the average case performance.

3. Asymmetric Binary Search

In accordance with yet another embodiment, further improvements can be made to those described thus far. The improvements involve the introduction of asymmetry in the parallelized binary search.

As discussed earlier, the technique of stealing search instances only improves the average case search performance. The worst and average case performance of a search instance with the shortest set of prefixes remains unchanged, while the average case performance of search instances which are able to steal other instances improves. This leaves the ranges with longer prefix lengths better average case search times. Lookups can be performed more efficiently if the average and worst cases of the each of the search instances is equalized.

Two forms of asymmetry are possible, and they each serve a distinct purpose. The first form of asymmetry serves to make the worst case performance of a given search instance the same for both the all-hit and all-miss cases. The reason for the differences in the worst search time for the two cases is that in the all-hit situation the search instance would steal other search instances and enlist their aid on the remaining range. This obviously improves the worst case on that range. To equalize the two cases, the initial search position is offset such that there are a greater number of prefix lengths which are longer than the search position than the number than are smaller. The end result is that each search instance is individually balanced in terms of average and worst case search time, but search instances which can steal a greater number of search instances now have a better worst case search time than those with fewer search instances to steal.

The second form of asymmetry is designed to equalize the worst case search time among all the search instances. This is done by taking into account the number of search instances that could be stolen. Search instances which are searching longer prefix lengths, and thus can take more advantage of stealing, are given wider initial ranges to search. The result is that each search instance has the same worst case search time, and the total number of prefix lengths that can be searched, for a given number of parallel memory accesses, is increased.

Achieving the above asymmetries for this algorithm can be done in two ways. The first technique uses a fixed order search based on an ideal search order and the second is an approximation of the ideal search order based on observable properties of the ideal search order.

A. Ideal Asymmetric Binary Search

The goal of the ideal asymmetric search is to provide a search order that searches the greatest number of bins possible with a given number of searches instances and memory accesses. This is achieved by forcing each search instance to have the same worst case, and by having every search instance active for the duration of the search.

FIG. 8 shows an ideal search order, and provides some insight into how this order is constructed. In this figure the digits indicate the number of searches required to find an entry in that bin. For example, with a single search instance and a maximum of 2 lookups, the field indicates "212". This means that entries in the first and third bins will be found in 2 lookups, and the second bin will be searched in the first lookup. For the same worst case with two search instances, the result is the concatenation of the first two columns or "2122122". The second row (212) of the first column shows the range that can be searched by a single search instance. It is clear that this is the search order of a plain binary search. Looking at the second row of the second column, the range is larger due to the ability for this search instance to steal the lower one. Thus "2122" is the "212" of a regular binary search with the first search instance providing the missing "2" in the event it is stolen. Thus constructing the ideal search orders is a recursive process as what each search instance is able to do in an additional lookup is dependant on what it, and other search instances searching shorter prefixes were able to do in previous lookups.

Constructing the ideal search order, by definition, results in the two forms of asymmetry discussed above. Thus, the starting search position will be in the lower half of the search range, and search instances searching larger prefix lengths will have larger ranges.

Figure 6:
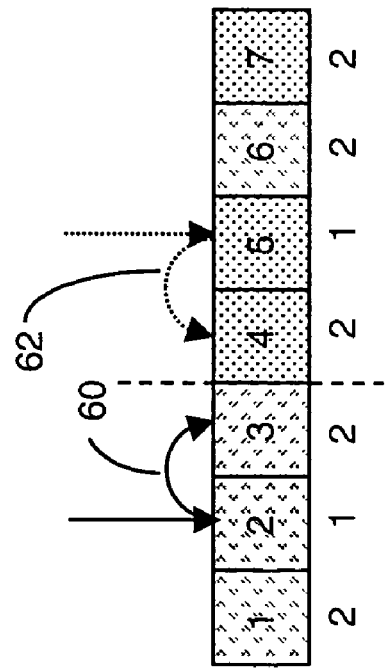
FIGS. 6 and 7 show two examples of asymmetric searches with redistribution of search instances, involving 7 memory bins, in accordance with further embodiments of the invention.
Figure 7:
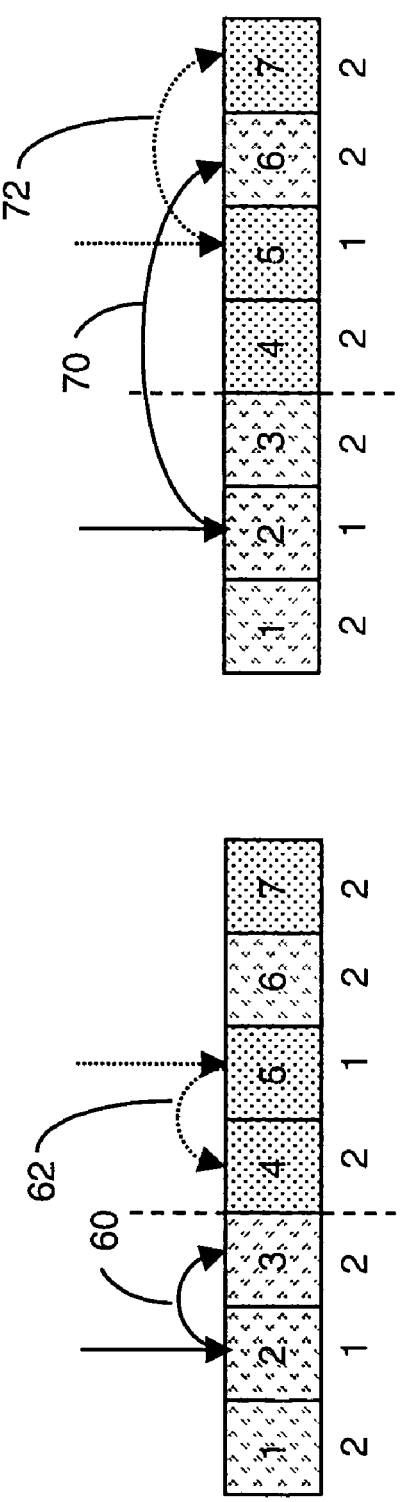

FIGS. 6 and 7 show two examples of ideal asymmetric searches with redistribution of search instances. To simplify the discussion, both figures show only 7 memory bins each. In reality, many more bins will be needed but the principle to be described below is equally applicable. In both examples, the first search instance is searching the range [1, 3], and the second has the larger range [4, 7]. The lightly shaded bins show where the first search instance could search, and the darker shaded bins are those which the second search instance could search. In example of FIG. 6, the search results in a best match in bin 3. Initially the search instances are looking at lengths 2 and 5. The first instance will hit a marker indicating that it should search longer prefixes, as indicated by an arrow 60. The second search instance will find nothing, meaning it needs to search shorter prefixes as indicated by an arrow 62. On the second search, the first search instance finds the result in bin 3. This example does not involve redistribution of search instances. In the example of FIG. 7, the second search instance finds a marker on the first search in bin 5. At this point it is known that the longest matching prefix is above 5, so the two search instances are now redistributed over the range [6, 7] as shown by arrows 70 and 72. Either one of the instances will find the LPM in the next round of searches at either bin 6 or 7. It should be noted that in cases where there is a wider range, the redistribution is weighted just like the initial asymmetrical allocation of bins to ranges. Below each example the number of lookups (memory accesses) needed to reach that length is shown. It is easy to see that the worst case lookup is 2, and the average number of lookups is approximately 2 as well.

As seen above, FIGS. 6 and 7 show that with two search instances, and the maximum number of lookups bounded at two, it is possible to search seven bins. As the number of search instances and lookups increase the number of bins that can be searched dramatically increases. For example, with four search instances and number of lookups bounded at four a total of 191 bins can be searched. This compares well to the basic, and simply parallelized binary search algorithms which can search only 16, and 64 bins respectively in four serial memory accesses.

Knowing the number of search instances, and the behavior of each, it is possible to work out the most optimal search order for all the search instances to take, based on the previously mentioned redistribution of search instances. Unfortunately, in the case of the invention, the next search position cannot be easily expressed mathematically. Instead the search instances follow a predefined search order which depends on the results of their own search, and the searches of instances at longer prefix lengths. In the most ideal case this results in a search order that can search an awkward (not 128, 64, or 32) number of prefix lengths.

FIG. 8 is a table that shows the ideal asymmetric search pattern with four search instances. In the figure, the layout of bins that can be searched in a maximum number (worst case) of lookups is also shown. Due to its size, the table is broken down in three parts. Each range column shows the size of the initial range and the number of lookups to reach each index in that range. For example, by the first memory access, each of four search instances can search one memory bin in each range. By the second memory access, the first search instance can probe the maximum of 3 bins which is the size of range 1, while the fourth search instance can search 6 bins. The fourth memory access, however, can reach 15 bins in range 1, 32 bins in range 2, 56 bins in range 3 and 88 bins in range 4. The total number of bins therefore comes to 191 bins.

FIGS. 9 and 10 are also tables that show the sizes of the ideal ranges and total prefix lengths (the total number of bins) that can be searched with several search instances. FIG. 9, in particular, shows the size of each range for each worst case lookup, while FIG. 10 shows the total number of bins being searched depending on the worst case lookup and the number of search instances. As mentioned earlier, with four search instances for example, the total of 191 memory bins is searchable within the maximum (worst case) of four memory accesses.

B. Approximated Asymmetric Binary Search

A further embodiment relies on the relative sizes of the initial ranges which were derived for the ideal asymmetric search as shown in FIGS. 8 and 9. The objective of this approach is to approximate the ideal search order by defining relationships from the ideal search order. From FIG. 9, it can be noted that there is an approximate ratio of 1:2:4:8: . . . between the range size for the individual search instances. The general rule "Each search instance has a range twice the size of the previous" can be formed. The cause of this relationship between the ranges is that the range for one search instance effectively contains subranges made up of the ranges of all the search instances searching shorter prefix lengths. The next approximation is the search position within each range. From FIG. 8, it can be noted that for the first search instance the search position is always at the midpoint of the range. For the other search instances, the search position is located at approximately a third of the way into the range. Thus the second rule "The first search instance will search at the midpoint of the range, and all other search instances will search one third of the way into their range" is derived. The reason for this asymmetry comes from the fact that a hit would result in stealing all lower search instances, so the search position is in the lower half of the search range.

Unfortunately, using the above observations can result in inefficiencies under certain conditions. Thus, some additional modifications can be made to further enhance this method. Using the above approximations, it can be seen that for 15 bins, and using the 1:2:4:8: . . . ratio, the first search instance will be searching only one bin, and the fourth search instance will be searching 8. It is clear that up to 3 searches are required to search all 8 bins, taking into account stealing, but the first search instance will become idle after only the first search unless it is stolen. Thus to even out the worst cases between the ranges a set of minimum range sizes are proposed in the table below. Each row in the table indicates the number of search instances being used. Each column indicates the minimum range size that should be used. Each entry in the table indicates the total number of bins that should be searched given the number of search instances and the minimum number of bins per search instance. The last column indicates the number of bins that should be searched using the above approximations unmodified. As an example, given 3 search instances and 19 bins, each search instance should not have an initial range smaller than 3 bins.

| Search Instances | Minimum 1 bin | Minimum 3 bins | Estimated Bins |
|---|---|---|---|
| 2 | 1-5 | 6-9 | 10-128 |
| 3 | 1-8 | 9-20 | 21-128 |
| 4 | 1-9 | 10-44 | 45-128 |

Depending on the exact implementation these values can be adjusted to achieve better performance.

Variations from the Base Algorithm:

The improvements described thus far will indirectly result in some other variations from the base algorithm. Two particular areas of interest will be described below, i.e., the use of markers, and route updates.

A. Markers

Due to the nature of binary searching on prefix lengths, markers may need to be inserted to indicate the presence of a prefix longer than that currently being searched. The consequence of this is that the hash table will be filled with extra entries as a single route may require the insertion of several markers. With the basic algorithm, the maximum number of markers that can be inserted is $\log_2(W)$, where W is the width of the IP address. This can easily be seen by viewing the binary search as a tree dictating the search lengths. For IPv6 there are at most 6 markers for a given route.

Fortunately for the algorithm described in this specification, the resulting binary tree structure is actually a set of small trees. Thus, the number of markers for a route decreases. For IPv6 with 4 search instances, only at most 2 markers are required. Also the number of prefix lengths that can result in markers has decreased to 42 from 63 in the basic algorithm.

B. Table Updates

Another change to the base algorithm is the change to how route updates are made. Because of the change to the search order, route insertions must take into account the predefined search order when inserting routes with markers. Finally, additional performance can be achieved if the search instances are aware of which bins are occupied. Thus, a structure dictating which prefix lengths are present in the hash table must also be maintained and updated with changes to the routing table.

Implementation

A general implementation of the embodiments of the invention will be described below. The implementation will assume 128 bins, as this is the worst possible case for IPv6, and four search instances. This should satisfy the requirements for IPv6 applications. Four search instances are chosen simply to illustrate the improvements according to the present invention. As the number of search instances decreases, the performance approaches that of the basic algorithm described in the above referenced U.S. Patent. If more were chosen, the performance would approach the ideal case of one memory access, but memory bandwidth would be very high.

As mentioned earlier, four search instances are able to search 191 memory bins at the worst case of four memory accesses. By the definition of IPv6, there will never exist 191 prefix lengths. The initial ranges (ideal asymmetry shown in FIG. 8) are truncated in a manner that maintains, as much as possible, the predefined search order of the range. In fact, only a contiguous range containing the starting point of a search instance needs to be preserved. FIG. 11 shows one example of the resulting ranges which contain the total 128 memory bins to be applicable to IPv6. The search order within each range for its search instance is also shown. As seen in the figure, initial range 1 has been truncated by one bin on the right, while range 2 by 14 bins. Likewise, range 3 has been truncated by 14 bins to a size of 42 bins, and range 4 by 44 bins to the size of 44 bins. It should be noted that some slight adjustments have been made to this assignment in order to simplify the implementation in that the first bin of the last search instance (range 4) has been moved to the end of the third search instance (range 3) to complete the last parallel search in that range.

FIG. 12 illustrates schematically a router according to one embodiment of the invention. In the Figure, a router 80 contains a packet transmitter/receiver 82 which transmits/receives packets to/from a network 84 through one or more ports 86. A local terminal 88 is connected to the router through an analyzer module 90 which analyzes the packets received from the network and local terminal and makes a decision as to whether or not to accept packets from the network or to which port to send packets received from the local terminal. The router contains a routing table 92 in database and a controller 94 in the form of a processor to coordinate all the operations. A memory is provided to store longest match found in a round of searches. There may be more than one processor as mentioned earlier. The routing table embodies the features described in this specification to perform the functions of the invention.

In the majority of cases, there will be less than 128 memory bins to search. Currently, the majority of IPv6 routing tables contain less than 20 distinct prefix lengths. There are two possible ways to accommodate this case. The first is to dynamically resize the search ranges so that each search instance has some portion of the total range. This requires that the size of each range can be efficiently calculated at runtime, which can be difficult if the LPM and asymmetry improvements are used to their fullest. The main advantage of this implementation is that it reduces the worst case performance, and results in the fastest possible search. The second implementation possibility is to simply allow search instances to follow their fixed search pattern. If the bin a search instance wants to search does not exist, the search instance assumes a search miss and moves to bins of shorter prefix lengths. The advantage of this implementation is that it is simple to implement, and reduces the overall memory bandwidth while maintaining a fixed worst case.

Since the behaviour of the ideal asymmetric search is very difficult to describe mathematically the most obvious way of implementing the binary search is by using a state or jump table. Since the order that each search instance will examine the bins is predetermined the state table can be constructed at initialization. After each set of parallel searches, each search instance will, based on the results of their search and the searches of search instances searching longer prefix lengths, retrieve their new position from the state table. To conserve memory, instead of storing absolute positions in the state table, the table could hold relative positions. Additionally, information required for a search instance that is being stolen can be extracted from this table and put in a separate table. Since this information is very repetitive, creating this second table saves a significant amount of memory. FIG. 13 shows a possible format for the relative state information. Using this format there would be one entry per bin. FIG. 14 shows a possible format for the information in the steal table. As before, this table stores relative information, and only one entry per search instance, except the last instance, is necessary. It should also be noted that each entry requires one field for every lookup except the last. In this example, four search instances are assumed, and the worst case lookup is bounded at four lookups so three fields are necessary.

According to a yet further embodiment, to conserve memory bandwidth, search instances, that while traveling along their predetermined path are at a prefix length which does not exist in the routing table, can be disabled. This means that only the bins which actually contain prefixes are searched. This modification can be implemented in any number of ways, two of which are to 1) have a table which shows which prefix lengths are active, or 2) aggregate all the prefix lengths at one end of the search pattern, and indicate what the prefix length of each bin is. According to the first implementation, there are altogether 128 bins, for example, some of which are empty. If a search instance has to search an empty bin there could be some indicator that tells the instance that the bin is empty. The search instance will then assume a miss (a marker would make the bin non-empty), but this would result in a memory bandwidth savings. For the second implementation, there are also 128 bins, for example, some of which are empty. This implementation removes the empty bins, and push all the bins down to one end. Any search instance whose range does not have any bins in it is automatically disabled.

The pseudo-code in FIG. 15 describes the basic algorithm with all of the optimizations described above, using the above state table implementations. It should be noted that this pseudo code does not show how hash collisions are handled.

Overall performance of the algorithm is dependant on several factors
  Number of unique prefix lengths—number of bins
  Number of prefixes per length—number of hash collisions
  Number of search instances—size of ranges
  Hash table sizing—number of hash collisions
  Hash functions—number of hash collisions
The invention results in the following advantages:

Parallelization allows the overall latency of the lookup to be significantly reduced compared to other software search algorithms. This allows the algorithm to forward packets at higher speeds without the need for increased memory speed.

Since the algorithm is based on hash tables and not trees, the amount of memory required will not depend as much on the number of routes, and will be significantly smaller than tree based algorithms. This allows for IPv6 to be implemented on existing products without requiring memory upgrades to accommodate large routing table data structures.

Unlike other IPv6 lookup algorithms which can have very variable worst case lookup times, the invention will maintain a bounded worst case number of serial memory accesses, assuming perfect hashing. Under certain conditions the invention will be able to conserve memory bandwidth, by disabling unnecessary search instances, while maintaining a bounded worst case.

The algorithm is very configurable and its parameters (hash table size, and number of search instances) can be tuned to produce very predictable performance in terms of number of serial memory accesses and bandwidth usage. This allows the algorithm to be employed on a wide range of products.

One of the properties of the algorithm is that when there are fewer than the maximum number of prefix lengths to search, search instances that are out of range are simply inactive. This means that the search is performed at exactly the same speed, but fewer memory accesses are used.

Compared to some other IPv6 lookup algorithms, the invention may have slightly higher memory bandwidth usage. However, compared to the significant reduction in total lookup latency, the additional memory bandwidth is minimal.

Since the algorithm makes heavy use of hashing functions and needs to perform operations on 128 bit addresses it requires a lot of processing. This amount is, however, comparable to other algorithms performing IPv6 lookups.

Additionally the invention solves many of the IPv6 scalability issues such as table size.

The invention can easily be implemented, for example, in ASICs, FPGAs, GPPs, and NPs. Although the algorithm is parallelized, it can be implemented even on a single processing unit.

What is claimed is:

1. A method of searching a LPM (longest prefix match) to perform a single search in a database which holds a plurality of prefixes in groups and defines an initial search area made up of a plurality of ranges, comprising steps of:
   (a) performing a round of binary LPM searches by executing a plurality of search instances in parallel, each search instance searching in a different range of the initial search area;
   (b) in response to the last round of binary LPM searches, defining a new search area by eliminating, from further searches, one or more ranges;
   (c) performing a further round of binary LPM searches to perform the single search by executing the plurality of search instances in parallel, each search instance searching in a different sub-range of the new search area;
   (d) in response to the last round of binary LPM searches, defining further a new search area by eliminating, from further searches, one or more sub-ranges;
   (e) storing a longest match found in a round of binary LPM searches, and
   (f) if necessary, repeating steps (c) to (e) to further narrow the new search area until either one of the search instances finds a longest matching prefix or all the search areas have been searched, in which case the last longest match becomes the longest matching prefix.

2. The method according to claim 1 wherein the database is a routing table in a packet forwarding device and the plurality of prefixes are logically sorted in groups in an ascending order of their lengths.

3. The method according to claim 2, wherein step (a) is performed with search instances starting at predetermined locations within their respective ranges, the predetermined locations being at about the midpoint in the lowest range and being progressively shifted toward the respective low ends within higher ranges.

4. The method according to claim 3, wherein the step of defining the new search area comprises a step of:
   eliminating those ranges or sub-ranges which contain prefixes shorter than the longest match of the last round of the binary LPM searches.

5. The method according to claim 4, wherein the step of performing a further round of binary LPM searches comprises further steps of:
   in response to the last round of binary LPM searches, determining locations within the new search area at which the search instances start the next round of binary LPM searches,
   directing the search instances which searched the eliminated ranges or sub-ranges in the last round to begin the further round of binary LPM searches at the determined locations.

6. The method according to claim 5, wherein when determining the locations within the new search area, the order of the search instances are maintained.

7. The method according to claim 3, wherein the step of executing a plurality of search instances in parallel, comprises a step of:
   issuing parallel memory accesses to several memory banks at once to access in parallel a plurality of bins in either the initial or new search area.

8. The method according to claim 3, wherein the step of executing a plurality of search instances in parallel, comprises a step of:
   issuing several memory accesses to a single memory bank to access in parallel a plurality of bins in either the initial or new search area such that the latencies of these memory accesses overlap.

9. The method according to claim 3, wherein the step of executing a plurality of search instances in parallel comprises a step of:
   issuing a plurality of prefetch instructions and accessing in parallel a plurality of locations in either the initial or new search area.

10. The method according to claim 6, wherein the step of executing a plurality of search instances in parallel, comprises a step of:
    issuing parallel memory accesses to several memory banks at once to access in parallel a plurality of bins in either the initial or new search area.

11. The method according to claim 6, wherein the step of executing a plurality of search instances in parallel; comprises a step of:
    issuing several memory accesses to a single memory bank to access in parallel a plurality of bins in either the initial or new search area such that the latencies of these memory accesses overlap.

12. The method according to claim 6, wherein the step of executing a plurality of search instances in parallel comprises a step of:
    issuing a plurality of prefetch instructions and accessing in parallel a plurality of locations in either the initial or new search area.

13. A method of conducting a LPM (longest prefix match) search to perform a single search in a packet forwarding device having a routing table containing a plurality of prefixes stored in a plurality of bins, each of which may contain one or more prefixes of the same length and markers, all the bins being logically sorted in an ascending order of their lengths and defining an initial search area which are divided into a plurality of contiguous ranges, within each of which range the bins are logically preordered for access in each round of binary LPM searches, comprising steps of:
    (a) performing a first round of binary LPM searches by executing a plurality of search instances in parallel, each search instance searching in its respective range, starting at the bin preordered for the first access within the range;
    (b) continuing further rounds of binary LPM searches by executing a plurality of search instances in parallel, each search instance searching in its respective range, starting at a successively preordered bin or at one directed by a marker;

(c) if a match or marker is found by a search instance in each round of binary LPM searches, storing it in a memory as a last longest match;

(d) defining a new search area by eliminating, from further searches, one or more ranges containing bins of prefix lengths shorter than the last longest match;

(e) performing a further round of binary LPM searches to perform the single search by executing the plurality of search instances in parallel, each search instance searching in a different sub-ranges of the new search area, and (f) if necessary, repeating steps (b) to (e) to further narrow the new search area until either one of the search instances finds a longest matching prefix or all the search areas have been searched, in which case the last longest match becomes the longest matching prefix.

14. The method according to claim 13, wherein step (e) comprises further steps of:

in response to the last round of searches, determining bins within the new search area at which the search instances start the next round of searches, and directing one or more search instances which searched in ranges or sub-ranges of prefixes shorter than the last longest match during the last round to begin the further round of searches starting at the detemined bins of the new search area which contains the last longest match.

15. The method according to claim 14, wherein the number of bins in each ranges are predetermined and the bins ordered first for access in each range are located at about the midpoint of the lowest range and at locations progressively offset toward the low end of each of the higher ranges.

16. The method according to claim 15, wherein the step of executing a plurality of search instances in parallel, comprises a step of:

issuing parallel memory accesses to several memory banks at once to access in parallel a plurality of bins in either the initial or new search area.

17. The method according to claim 15, wherein the step of executing a plurality of search instances in parallel, comprises a step of:

issuing several memory accesses to a single memory bank to access in parallel a plurality of bins in either the initial or new search area such that the latencies of these memory accesses overlap.

18. The method according to claim 15, wherein the step of executing a plurality of search instances in parallel, comprises a step of:

issuing a plurality of prefetch instructions and accessing in parallel a plurality of bins in either the initial or new search area.

19. An apparatus for conducting LPM (longest prefix match) searches to perform a single search in a packet forwarding device, comprising:

a routing table containing a plurality of prefixes to be searched and defining an initial search area;

a plurality of search instances for performing a plurality of rounds of parallel binary LPM searches in their respectively assigned portions of the initial search area;

an analyzing module for defining a new search area within the initial search area in response to the results of a last round of binary LPM searches;

a memory for storing a longest match found in a round of binary LPM searches;

a controller for assigning the search instances to perform successive rounds of binary LPM searches to perform the single search within mutually different portions of the new search area until one of the search instances finds the longest matching prefix.

20. The apparatus according to claim 19, wherein the routing table comprises a plurality of bins, each of which contains one or more prefixes of a same length and may also contain at least one marker, the bins being logically sorted in order of their prefix lengths and the initial search area being divided into a plurality of contiguous ranges, each range containing a predetermined number of bins.

21. The apparatus according to claim 20, wherein within each range, bins are preordered for access by the search instances for each round of searches, if no match or marker is found.

22. The apparatus according to claim 21, wherein the ranges contain sufficient number of bins to accommodate a desired number of prefixes in compliance with IPv6.

23. The apparatus according to claim 22, wherein the size of the ranges are predetermined so that the worst case memory accesses are evened out across all the ranges.

24. The apparatus according to claim 23, wherein the number of bins in each ranges are predetermined and bins ordered first for access in each range are located at about the midpoint in the lowest range and at locations progressively offset toward the low end of each of the higher ranges.

25. The apparatus according to claim 19, wherein the controller further comprises a memory access mechanism for issuing parallel memory accesses to several memory banks at once to access in parallel a plurality of bins in either the initial or new search area.

26. The apparatus according to claim 19, wherein the controller further comprises a memory access mechanism for issuing several memory accesses to a single memory bank to access in parallel a plurality of bins in either the initial or new search area such that the latencies of these memory accesses overlap.

27. The apparatus according to claim 19, wherein the controller further comprises a memory access mechanism for issuing a plurality of prefetch instructions to access in parallel a plurality of bins in either the initial or new search area.

28. The apparatus according to claim 24, wherein the controller further comprises a memory access mechanism for issuing parallel memory accesses to several memory banks at once to access in parallel a plurality of bins in either the initial or new search area.

29. The apparatus according to claim 24, wherein the controller further comprises a memory access mechanism for issuing several memory accesses to a single memory bank to access in parallel a plurality of bins in either the initial or new search area such that the latencies of these memory accesses overlap.

30. The apparatus according to claim 24, wherein the controller further comprises a memory access mechanism for issuing a plurality of prefetch instructions to access in parallel a plurality of bins in either the initial or new search area.

* * * * *